(12) United States Patent
Ishii et al.

(10) Patent No.: US 11,731,106 B2
(45) Date of Patent: Aug. 22, 2023

(54) COLUMN PACKING MATERIAL FOR SUPERCRITICAL FLUID CHROMATOGRAPHY, COLUMN FOR SUPERCRITICAL FLUID CHROMATOGRAPHY AND PREPARATION METHOD THEREFOR

(71) Applicant: SHIMADZU CORPORATION, Kyoto (JP)

(72) Inventors: Risa Ishii, Hitachi (JP); Michio Butsugan, Hitachi (JP); Keita Sakurai, Hitachi (JP); Yuka Fujito, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 16/590,435

(22) Filed: Oct. 2, 2019

(65) Prior Publication Data

US 2021/0101131 A1    Apr. 8, 2021

(51) Int. Cl.

| | |
|---|---|
| *B01J 20/26* | (2006.01) |
| *B01D 15/20* | (2006.01) |
| *B01D 15/40* | (2006.01) |
| *G01N 30/56* | (2006.01) |
| *B01J 20/28* | (2006.01) |
| *B01J 20/30* | (2006.01) |
| *C08F 20/14* | (2006.01) |
| *B01J 20/281* | (2006.01) |
| *G01N 30/02* | (2006.01) |

(52) U.S. Cl.
CPC .......... *B01J 20/267* (2013.01); *B01D 15/206* (2013.01); *B01D 15/40* (2013.01); *B01J 20/281* (2013.01); *B01J 20/28004* (2013.01); *B01J 20/3085* (2013.01); *C08F 20/14* (2013.01); *G01N 30/56* (2013.01); *C08F 2810/20* (2013.01); *G01N 2030/027* (2013.01); *G01N 2030/565* (2013.01)

(58) Field of Classification Search
CPC ..... B01D 15/40; B01D 2323/30; B01J 20/267
See application file for complete search history.

(56) References Cited

U.S. PATENT DOCUMENTS

| | | | |
|---|---|---|---|
| 9,327,269 B2 | 5/2016 | Shibata et al. | |
| 2015/0182943 A1 | 7/2015 | Shibata et al. | |
| 2018/0313795 A1* | 11/2018 | Fujito | .................... B01J 20/285 |

FOREIGN PATENT DOCUMENTS

| | | | | |
|---|---|---|---|---|
| EP | 2876439 A1 * | 5/2015 | .......... | B01J 20/3272 |
| JP | 58-32164 A | 2/1983 | | |
| JP | 1-314962 A | 12/1989 | | |
| JP | 2000-107597 A | 4/2000 | | |
| JP | 2007-298455 A | 11/2007 | | |
| WO | 2014/017280 A1 | 1/2014 | | |

OTHER PUBLICATIONS

Gemmel et al. "Separation of Oligomers of Medium Polarity by Packed Column Supercdtical Fluid Chromatography" (Chromatographia, vol. 27, No. 11/12, p. 605-610, Jun. 1989). (Year: 1989).*

Communication dated Sep. 15, 2020 by the Japanese Patent Office in application No. 2017-090559.

* cited by examiner

*Primary Examiner* — Ryan B Huang
(74) *Attorney, Agent, or Firm* — Sughrue Mion, PLLC

(57) ABSTRACT

A column packing material for supercritical fluid chromatography which allows good peak shape to be obtained in the analysis of free fatty acids, etc. and in the analysis of agricultural chemicals, etc., and has excellent durability for repeated analysis. The column packing material for supercritical fluid chromatography includes polymer particles containing cross-linked polymer, the degree of swelling of which after absorbing tetrahydrofuran and the degree of swelling of which after absorbing methanol are both 1.4 or less.

8 Claims, 6 Drawing Sheets

(a)

(b)

(a)

(b)

COLUMN PACKING MATERIAL FOR SUPERCRITICAL FLUID CHROMATOGRAPHY, COLUMN FOR SUPERCRITICAL FLUID CHROMATOGRAPHY AND PREPARATION METHOD THEREFOR

The entire contents of Japanese Patent Publication No. 2018-189442, which was published Nov. 29, 2018 (filed as JP 2017-090559 on Apr. 4, 2017), and is incorporated herein by reference. JP 2018-189442 includes the same inventors and describes the same invention as the present application. Foreign priority has not been claimed from JP 2017-090559.

TECHNICAL FIELD

The present invention relates to a column packing material for supercritical fluid chromatography, a column for supercritical fluid chromatography, and a preparation method therefor.

BACKGROUND ART

In recent years, supercritical fluid chromatography (SFC), which uses a supercritical fluid for the mobile phase, has attracted attention for separation and analysis of samples.

The supercritical fluid used for the mobile phase of SFC normally has low viscosity and high diffusibility, and is thus advantageous from the standpoint of not harming the separability of samples even under conditions of high flow velocity and allowing a high level of separation and analysis. Furthermore, carbon dioxide, which is usually used as the supercritical fluid, attains a supercritical state (supercritical carbon dioxide) under relatively mild conditions, and has high dissolving capability for a broad range of components, and so does not tend to impose restrictions as to the measured components. Furthermore, supercritical carbon dioxide becomes a gas at ambient temperature and pressure, so the processing for fractionation of separated components is simple, and has the advantage of using less organic solvent compared, for example, to liquid chromatography (LC) and allowing the environmental impact and cost to be reduced.

As a column packing material that can be used for the stationary phase of SFC, for example, particles, etc. comprising a porous inorganic carrier such as silica gel are known (for example, see undermentioned patent document 1).

PRIOR ART DOCUMENTS

Patent Documents (Patent document 1) International Publication No. 2014/017280

SUMMARY

Problem to be Solved

However, when particles comprising a silica gel carrier are used as a column packing material to perform analysis of free fatty acids and the like, in some cases, peaks will tail and a good peak shape cannot be obtained. Furthermore, when performing analysis of agricultural chemicals, in the analysis of multiple components, depending on the components being analyzed, it may not be possible to obtain good peak shape: for example, with organic phosphorus compounds such as dichlorvos, methacrifos, and the like, peak splitting may occur. Additionally, column packing material using particles comprising a silica gel carrier cannot be said to have adequate durability for repeated analysis, so practically speaking, there is still room for improvement.

The present invention was made in view of such circumstances, it being an object of the present invention to provide a column packing material for SFC, which allows good peak shape to be obtained in the analysis of free fatty acids, etc. and in the analysis of agricultural chemicals, etc., and has excellent durability for repeated analysis, as well as providing a column for SFC comprising such packing material, and a production method for such packing material and column.

Means for Solving the Problem

The present invention provides a column packing material for supercritical fluid chromatography comprising polymer particles containing cross-linked polymer, the degree of swelling of which after absorbing tetrahydrofuran and the degree of swelling of which after absorbing methanol are both 1.4 or less.

The column packing material for SFC according to the present invention allows good peak shape to be obtained in the analysis of free fatty acids, etc. and in the analysis of agricultural chemicals, etc., and also has excellent durability for repeated analysis.

The cross-linked polymer may comprise at least one member of the group consisting of divinyl benzene derived structural units and di(meth)acrylic acid ester derived structural units.

The mean particle diameter of the polymer particles may be 1 to 10 μm.

The degree of cross-linking of the cross-linked polymer may be 50% or greater.

The present invention furthermore provides a column for SFC, comprising a packing material according to the present invention as described above.

The present invention moreover provides a method of preparing a packing material according to the present invention as described above, comprising a step of obtaining polymer particles by inducing seed polymerization of a polymerizable monomer in the presence of seed particles.

The present invention furthermore provides a method of preparing a column for SFC, comprising a step of packing a packing material according to the present invention as described above into a tubular column main body section such that the packing pressure becomes 10 MPa or greater.

Effect of the Invention

According to the present invention, it is possible to provide a column packing material for SFC, which allows good peak shape to be obtained in the analysis of free fatty acids, etc. and in the analysis of agricultural chemicals, etc., and has excellent durability for repeated analysis, as well as to provide a column for SFC comprising such packing material, and a production method for such packing material and column.

Figure 1:
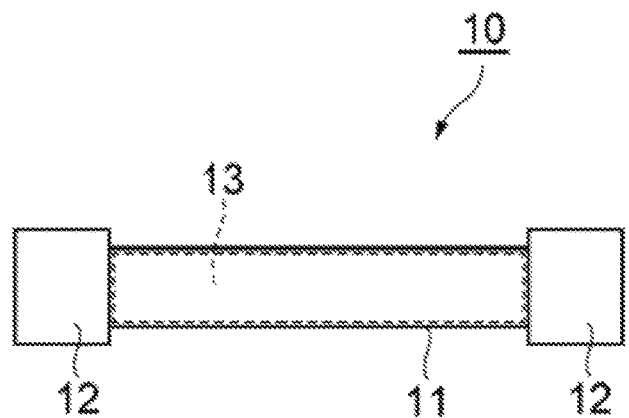
FIG. 1 is a simplified drawing illustrating an embodiment of a column for SFC.

DETAILED DESCRIPTION OF THE EXEMPLARY EMBODIMENT (Modes for Embodying the Invention)

A preferred mode of embodiment of the present invention will be described in detail below. The present invention is however not limited to the following mode of embodiment.

The column packing material for supercritical fluid chromatography (SFC) according to the present mode of embodiment comprises polymer particles containing cross-linked polymer. The degree of swelling of the polymer particles after absorbing tetrahydrofuran and the degree of swelling of the polymer particles after absorbing methanol are both 1.4 or less.

Column packing material for SFC using such polymer particles makes it possible to obtain good peak shape in the analysis of free fatty acids, etc., and is durable for repeated analysis.

The reasons for obtaining this effect are believed by the present inventors to be as follows. First, when conventional particles comprising silica gel carrier are used as a column packing material for SFC to perform analysis of free fatty acids, etc., the peaks end up tailing due to interaction between hydrophilic groups (for example, carboxyl groups of free fatty acids) and silanol groups. By contrast, it is believed that the column packing material for SFC according to the present mode of embodiment is not prone to causing problems such as those that occur when using silica gel carrier, and as a result, good peak shape can be obtained and durability is improved even when performing analysis of free fatty acids and the like.

Furthermore, column packing material using polymer particles swells readily due to absorption of supercritical fluids commonly used during analysis based on SFC, and the analytical performance may decrease due to excessive change in column pressure occurring during analysis as a result of such swelling. By contrast, with the polymer particles according to the present mode of embodiment, the degree of swelling after absorbing tetrahydrofuran and the degree of swelling after absorbing methanol are both low, at 1.4 or less, so in addition to not being prone to the effects of supercritical fluid during SFC analysis, when the polymer particles are packed into the column main body section, the column packing pressure can be adequately raised, which would make it possible to adequately suppress the decrease in analytical performance.

The degree of swelling of polymer particles according to the present mode of embodiment is not particularly limited so long as the degree of swelling after absorbing tetrahydrofuran and the degree of swelling after absorbing methanol are both 1.4 or less, but from the standpoint of reducing susceptibility to the effects of supercritical fluid and more fully preventing decrease in analytical performance, 1.3 or less, or 1.2 or less is preferable. The lower limit of the aforementioned degree of swelling is not particularly limited, and can be, for example, 1.0 or greater.

The degree of swelling of polymer particles can be determined, for example, based on volumetric change of particles before versus after dispersing in solvent. The method of measuring degree of swelling will be described in detail in an embodiment example below.

The mean particle diameter of the polymer particles according to the present mode of embodiment, for example, from the standpoint of obtaining a column with a high number of theoretical plates, is suitably 10 μm or less, 5 μm or less, or 4 μm or less. Furthermore, the lower limit value of the mean particle diameter of the polymer particles, for the standpoint of preventing excessive rise in column pressure during analysis, should be, for example, 1 μm or greater, or 2 μm or greater.

The coefficient of variation (CV) value, which indicates the dispersity of particle size (diameter) of polymer particles, from the standpoint of ease of obtaining a column with a high number of theoretical plates, should be 25% or less, 20% or less, 15% or less, or 10% or less. The lower limit of the CV value is not particularly limited, and can be, for example, 1% or greater. It will be noted that for adjustment of the aforementioned mean particle diameter and CV value, classification may be performed using an appropriate sieve or the like at one's discretion.

The mean particle diameter and CV value of polymer particles can be determined according to the following measurement method. First, the subject polymer particles are dispersed using an ultrasonic disperser in water to which surfactant has been added, to prepare a dispersion containing 1% by mass of polymer particles. The dispersion is then measured/computed using a laser diffraction/scattering type or electrical resistance type particle size distribution analyzer. CV value is computed using the following formula.

$$CV\ (\%) = (\sigma/D) \times 100$$

σ: standard deviation, D: mean particle diameter

The degree of swelling of the polymer particles can be controlled, for example, by adjusting the degree of cross-linking of the cross-linked polymer contained in the polymer particles. More specifically, the degree of swelling of the polymer particles tends to be reduced by increasing the degree of cross-linking of the cross-linked polymer. The degree of cross-linking of the cross-linked polymer in the present mode of embodiment is, for example, 50% or greater, 80% or greater, or 90% or greater. A degree of cross-linking within the aforesaid range reduces susceptibility to the effects of supercritical fluid and makes it possible to more fully prevent decrease in analytical performance. The upper limit of the degree of cross-linking is not particularly limited, and can be, for instance, 100% or less.

The degree of polymerization of the cross-linked polymer can be determined based on the blending rate of cross-linkable polymer as described below. Specifically, the degree of cross-linking is defined as the mass proportion of cross-linkable monomer with reference to the total mass of polymerizable monomers used.

The polymer particles according to the present mode of embodiment are particles containing cross-linked polymer, which is formed, for example, by polymerizing polymerizable monomers including a cross-linkable monomer. Namely, the cross-linked polymer may have structural units derived from polymerizable monomers. Furthermore, the polymer particles may contain silica, etc., but the content of the cross-linked polymer in the polymer particles, for example, from the standpoint of obtaining good peak shape when analyzing highly hydrophilic samples and from the standpoint of more effectively improving durability, should be 80% by mass or greater, 90% by mass or greater, or 95% by mass or greater with reference to the total mass of the polymer particles. The upper limit of the content of the cross-linked polymer in the polymer particles is not particularly limited, being for example 100% by mass or less with reference to total mass of the polymer particles.

For the polymerizable monomers, from the standpoint of obtaining better peak shape and obtaining a column with superior durability, cross-linkable monomers (polyfunctional monomers) are preferably used at 50% by mass or greater, 80% by mass or greater, or 90% by mass or greater with reference to the total amount of polymerizable monomers. Namely, this is preferably the same as the degree of cross-linking of the cross-linked polymer discussed above. The upper limit on the amount of cross-linkable monomers used is not particularly limited, being for example 100% by mass or less with reference to the total quantity of polymerizable monomers.

Examples of the polymerizable monomers include divinyl compounds such as divinyl benzene, divinyl biphenyl and divinyl naphthalene; diallyl phthalate and isomers thereof; triallyl isocyanurate and derivatives thereof; polyfunctional (meth)acrylic acid esters and the like. These can be used singly or in combinations of two or more.

Examples of the polyfunctional (meth)acrylic acid esters include di(meth)acrylic acid esters, trifunctional and higher (meth)acrylic acid esters and the like.

The di(meth)acrylic acid esters are not particularly limited so long as they have two (meth)acryloyl groups, and include, for example, alkanediol di(meth)acrylate. The alkanediol di(meth)acrylate can be, for example, a compound represented by the following general formula (1).

(Chemical formula 1)

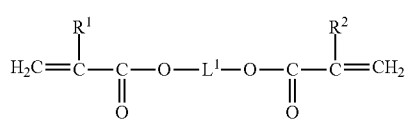

(1)

In formula (1), $R^1$ and $R^2$ each independently represent a hydrogen atom or methyl group, and $L^1$ represents an alkylene group. The carbon count of the alkylene group can be, for example, 1 through 20 or 1 through 5. The alkylene group may, for example, be substituted with substituents. Examples of the substituents include hydroxyl groups. Furthermore, the alkylene group may be straight-chain, branched or cyclic.

Examples of the alkanediol di(methacrylate) represented by formula (1) include 1,3-butanediol diacrylate, 1,4-butanediol di(meth)acrylate, 1,5-pentanediol di(meth)acrylate, 1,6-hexanediol di(meth)acrylate, 1,7-heptanediol di(meth)acrylate, 1,8-octanediol di(meth)acrylate, 3-methyl-1,5-pentanediol di(meth)acrylate, 1,9-nonanediol di(meth) acrylate, 1,10-decanediol di(meth)acrylate, neopentyl glycol di(meth)acrylate and glycerol dimethacrylate.

Other examples of di(meth)acrylic acid esters include di(meth)acrylates such as ethoxylated bisphenol A type di(meth)acrylates, propoxylated ethoxylated bisphenol A type di(meth)acrylates, tricyclodecane dimethanol di(meth)acrylates, 1,1,1-tris hydroxymethyl ethane di(meth)acrylates and ethoxylated cyclohexane dimethanol di(meth)acrylates; and (poly)alkylene glycol type di(meth)acrylates such as (poly)ethylene glycol di(meth)acrylates, (poly)propylene glycol di(meth)acrylates and (poly)tetramethylene glycol di(meth)acrylates.

Examples of the trifunctional or higher (meth)acrylates include trimethylol propane tri(meth)acrylate, tetramethylol methane tri(meth)acrylate, tetramethylol propane tetra(meth)acrylate, pentaerythritol tri(meth)acrylate, 1,1,1-tris hydroxymethyl ethane tri(meth)acrylate and 1,1,1-tris hydroxymethyl propane triacrylate. Trifunctional or higher (meth)acrylates that can be obtained commercially include, for example, NK esters made by Shin Nakamura Chemical Co., Ltd. (A-TMPT-6P0, A-TMPT-3E0, A-TMM-3LMN, A-GLY series, A-9300, AD-TMP, AD-TMP-4CL, ATM-4E, A-DPH).

Among these cross-linkable monomers, from the standpoint of increasing cross-linking density and making it easier to reduce the degree of swelling, for example, at least one member selected from the group consisting of divinyl benzenes and di(meth)acrylic acid esters may be used. Namely, the cross-linked polymer may contain at least one member selected from the group consisting of divinyl benzene derived structural units and di(meth)acrylic acid ester derived structural units.

Monofunctional monomers may be used along with cross-linking monomers. Examples of the monofunctional monomers include monofunctional (meth)acrylic acid esters such as methyl acrylate, ethyl acrylate, propyl acrylate, n-butyl acrylate, isobutyl acrylate, hexyl acrylate, 2-ethylhexyl acrylate, n-octyl acrylate, dodecyl acrylate, lauryl acrylate, stearyl acrylate, 2-chloroethyl acrylate, phenyl acrylate, methyl α-chloroacrylate, methyl methacrylate, ethyl methacrylate, propyl methacrylate, n-butyl methacrylate, isobutyl methacrylate, hexyl methacrylate, 2-ethylhexyl methacrylate, n-octyl methacrylate, dodecyl methacrylate, lauryl methacrylate and stearyl methacrylate; styrenes and derivatives thereof, such as styrene, o-methyl styrene, m-methyl styrene, p-methyl styrene, α-methyl styrene, o-ethyl styrene, m-ethyl styrene, p-ethyl styrene, 2,4-dimethyl styrene, p-n-butyl styrene, p-t-butyl styrene, p-n-hexyl styrene, p-n-octyl styrene, p-n-nonyl styrene, p-n-decyl styrene, p-n-dodecyl styrene, p-methoxy styrene, p-phenyl styrene, p-chlorostyrene and 3,4-dichlorostyrene; vinyl esters such as vinyl acetate, vinyl propionate, vinyl benzoate and vinyl butyrate; N-vinyl compounds such as N-vinyl pyrrole, N-vinyl carbazole, N-vinyl indole and N-vinyl pyrrolidone; fluorinated monomers such as vinyl fluoride, vinylidene fluoride, tetrafluoroethylene, hexafluoropropylene, trifluoroethyl acrylate and tetrafluoropropyl acrylate; and conjugated dienes such as butadien and isoprene. These may be used singly or in combinations of two or more.

Polymer particles according to the present mode of embodiment can be obtained by the seed polymerization method. The number of theoretical plates of the column usually increases as the particle diameter of the particles becomes smaller, but compared to silica gel particles, it would seem that forming polymer particles with a small particle diameter would tend to be more difficult. However, with the seed polymerization method, it should be easy to form particles with a small particle diameter, making it easy to obtain columns with a large number of theoretical plates. An example of the seed polymerization method will be described below.

The seed polymerization method is a method wherein seed polymerization of polymerizable monomers is induced in the presence of seed particles, or more specifically, a method wherein seed particles are allowed to swell in an emulsion containing polymerizable monomer (seed particles are made to absorb polymerizable monomer), after which the polymerizable monomer is polymerized. Namely, the polymer particles according to the present mode of embodiment may be particles obtained by causing seed particles to absorb a polymerizable monomer and then polymerizing said polymerizable monomer.

Examples of the seed particles include (meth)acrylate based particles and styrene based particles.

(Meth)acrylate based particles can be obtained by polymerization of (meth)acrylic acid esters. Examples of the (meth)acrylic acid esters include methyl acrylate, ethyl acrylate, propyl acrylate, n-butyl acrylate, isobutyl acrylate, hexyl acrylate, 2-ethylhexyl acrylate, n-octyl acrylate, dodecyl acrylate, lauryl acrylate, stearyl acrylate, 2-chloroethyl acrylate, phenyl acrylate, methyl α-chloroacrylate, methyl methacrylate, ethyl methacrylate, propyl methacrylate, n-butyl methacrylate, isobutyl methacrylate, hexyl methacrylate, 2-ethylhexyl methacrylate, n-octyl methacrylate, dodecyl methacrylate, lauryl methacrylate, stearyl methacrylate and other (meth)acrylic acid esters containing straight-chain or branched alkyl groups. These (meth)acrylic acid esters may be used singly or in combinations of two or more.

Styrene-based particles can be obtained through polymerization of styrenic monomers such as styrene, p-methyl styrene, p-chlorostyrene, chloromethyl styrene and α-methyl styrene. These styrenic monomers can be used singly or in combinations of two or more.

For the seed particles, the aforementioned (meth)acrylic acid esters and styrenic monomers may be used in combination with other monomers. Examples of other monomers include allyl alcohols, allyl phthalates and ally ethers. These monomers may be used singly or in combinations of two or more.

The seed particles can be synthesized by known methods such as the emulsion polymerization method, soap-free emulsion polymerization method or dispersion polymerization method, using the aforementioned monomers.

The mean particle diameter of seed particles can be adjusted according to the design particle diameter of the polymer particles to be obtained. From the standpoint of shortening the polymerizable monomer absorption time, the mean particle diameter of seed particles should be, for example, 2.0 µm or less, or 1.5 µm or less. From the standpoint of efficiently obtaining seed particles which are uniform and close to spherical, the mean particle diameter of the seed particles should be, for example, 0.1 µm or greater, or 0.5 µm or greater. From these standpoints, the mean particle diameter of the seed particles is preferably 0.1 to 2.0 µm, more preferably 0.5 to 2.0 µm, and even more preferably, 0.5 to 1.5 µm.

The coefficient of variation (CV) value, which indicates the dispersity of particle size (diameter) of seed particles, for example, from the standpoint of fully ensuring the uniformity of the obtained polymer particles, should be 10% or less, or 7% or less. The lower limit of CV value for seed particles is not particularly limited, being for example 1% or greater.

The mean particle diameter and CV value of seed particles can be determined by the same method as the mean particle diameter and CV value measurement method for polymer particles described above.

It will be noted that the mean particle diameter of the polymer particles described above may be adjusted so as to be, for example 2 to 10-fold or 2.5 to 7-fold relative to the mean particle diameter of the seed particles. Adjusting the mean particle size of the polymer particles to be within the above range makes it easier to obtain monodispersity of the polymer particles.

An example of the method of causing seed particles to absorb polymerizable monomer and then polymerizing the polymerizable monomer will be described specifically below.

First, seed particles are added to an emulsion containing polymerizable monomer and aqueous medium. The seed particles may be added directly to the emulsion or may be added after dispersing into an aqueous dispersion.

The emulsion is prepared by known methods. For example, the emulsion can be obtained by adding polymerizable monomer to an aqueous medium and dispersing into the aqueous medium with a homogenizer, ultrasonic treatment machine, nanomizer or other fine emulsification machine.

Examples of the aqueous medium include water or mixed media of water and aqueous solvent (for example, a lower alcohol). The aqueous solvent may contain a surfactant. As the surfactant, anionic, cationic, nonionic or amphoteric surfactants may be used.

Examples of the anionic surfactants include sodium oleate, castor oil potash and other fatty acid oils, sodium lauryl sulfate, ammonium lauryl sulfate, triethanolamine lauryl sulfate and other alkyl sulfuric acid esters salts, sodium dodecyl benzene sulfonate and other alkyl benzene sulfonates, alkyl naphthalene sulfonates, alkane sulfonates, sodium dioctylsulfosuccinate and other dialkyl sulfosuccinates, alkenyl succinic acid salts (dipotassium salts), alkyl phosphoric acid ester salts, naphthalene sulfonic acid formalin condensate, polyoxyethylene alkyl phenyl ether sulfuric acid ester salts, polyoxyethylene lauryl ether sodium sulfate and other polyoxyethylene alkyl ether sulfates, and polyoxyethylene alkyl sulfuric acid ester salts.

Examples of the cationic surfactants include alkyl amine salts such as lauryl amine acetate and stearyl amine acetate, and quaternary ammonium salts such as lauryl trimethyl ammonium chloride.

Examples of the nonionic surfactants include polyethylene glycol alkyl ethers, polyethylene glycol alkylaryl ethers, polyethylene glycol esters, polyethylene glycol sorbitan esters, polyalkylene glycol alkylamines or amides and other hydrocarbon-based nonionic surfactants, polyether-modified silicone-based nonionic surfactants such as polyethylene oxide and polypropylene oxide adducts of silicon, and fluorine-based nonionic surfactants such as perfluoroalkyl glycols.

Examples of the amphoteric surfactants include hydrocarbon surfactants such as lauryl dimethyl amine oxide, phosphoric acid ester surfactants and phosphorous acid ester surfactants.

The surfactants may be used singly or in combinations of two or more. Among the above surfactants, from the standpoint of dispersion stability during polymerization of the polymerizable monomer, anionic surfactants are preferable.

The emulsion may contain a polymerization initiator if necessary. The polymerization initiator may be dispersed in the aqueous medium after mixing in advance with the polymerizable monomer, or else the polymerization initiator and polymerizable monomer may be dispersed in aqueous mediums separately and then mixed.

Examples of the polymerization initiator include organic peroxides such as benzoyl peroxide, lauroyl peroxide, orthochlorobenzoyl peroxide, ortho-methoxybenzoyl peroxide, 3,5,5-trimethyl hexanoyl peroxide, t-butyl peroxy-2-ethylhexanoate and di-t-butyl peroxide; and azo compounds such as 2,2'-azobisisobutyronitrile, 1,1'-azobis-cyclohexane carbonitrile and 2,2'-azobis(2,4-dimethyl valeronitrile). The polymerization initiator can be used, for example, in the range of 0.1 to 7.0 parts by mass per 100 parts by mass of the polymerizable monomer.

In order to improve the dispersion stability of the seed particles, the emulsion may contain a polymer dispersion stabilizer. Examples of the polymer dispersion stabilizer include polyvinyl alcohol, polycarboxylic acids, celluloses (such as hydroxyethyl cellulose and carboxy methyl cellulose) and polyvinylpyrrolidone, which may be used in combination with inorganic water-soluble polymer compounds such as sodium tripolyphosphate. Of these, polyvinyl alcohol or polyvinyl pyrrolidone is preferable. The amount of the polymer dispersion stabilizer to be added is preferably from 1 to 10 parts by mass per 100 parts by mass of the polymerizable monomer.

In addition, the emulsion may contain water-soluble polymerization inhibitors such as nitrites, sulfites, hydroquinones, ascorbic acid, water-soluble vitamins B, citric acid and polyphenols. Including a polymerization inhibitor makes it possible to prevent emulsion polymerization of the polymerizable monomer in the emulsion.

After adding the seed particles to the emulsion, the seed particles are allowed to swell and absorb the polymerizable monomer. This absorption is usually performed by stirring the emulsion for 1 to 24 hours at room temperature after adding the seed particles. Absorption of the polymerizable monomer can also be promoted by heating the emulsion to about 30 to 50° C.

The seed particles swell by absorbing the polymerizable monomer. The mixing ratio of the polymerizable monomer to the seed particles is not particularly limited, and may be 800 parts by mass or more or 1,500 parts by mass or more per 100 parts by mass of the seed particles, for example, from the standpoint of efficiently producing polymer particles having the desired mean particle diameter. On the other hand, for example, from the standpoint of preventing the polymerizable monomer from undergoing suspension polymerization on its own in the aqueous medium and efficiently producing polymer particles having the target mean particle diameter, the mixing ratio of the polymerizable monomer may be 100,000 parts by mass or less, or 35,000 parts by mass or less, per 100 parts by mass of the seed particles. Whether or not absorption of the polymerizable monomer into the seed particles has been completed can be determined by observing the seed particles using an optical microscope to confirm enlargement of particle diameter.

Subsequently, the polymerizable monomer absorbed into the seed particles is polymerized to obtain polymer particles.

The polymerization temperature can be selected at one's discretion according to the type of polymerizable monomer, and may be, for example, 25 to 110° C. or 50 to 100° C. The polymerization reaction is preferably conducted by increasing the temperature after the seed particles have sufficiently swollen and the polymerizable monomer has been sufficiently absorbed, and after the polymerization initiator has been sufficiently absorbed if a polymerization initiator is used. After seed polymerization has been completed, the aqueous medium is removed from the polymerization solution, if necessary, by centrifugal separation or filtration, and polymer particles are separated by washing with water and solvent and then drying.

It will be noted that the polymer particles may be, for example, particles having a porous structure (porous particles). In order to obtain porous particles, an organic solvent is used, which promotes phase separation and formation of porosity in the particles during polymerization in the seed polymerization process. As the organic solvent, an organic solvent that is inert with respect to the polymerizable monomer and insoluble or hardly soluble in the aqueous medium (for example, with solubility in water at 25° C. of 3% or less) can be used.

Examples of such organic solvents include aliphatic or aromatic esters such as ethyl acetate, butyl acetate, dimethyl phthalate and diethyl phthalate, aromatic hydrocarbons such as toluene, benzene and xylene, as well as ethylene glycol monoethyl ether acetate, hexane, octane, decane, amyl alcohol, hexyl alcohol, heptyl alcohol, octyl alcohol and other hardly soluble alcohols and the like.

These can be selected at one's discretion according to the types of polymerizable monomers which are to form groups of the polymer to be obtained, and can be used singly or in a combination of two or more.

From the standpoint of stabilizing the polymerization reaction and obtaining the desired porous particles, the blending rate of organic solvent may be from 5 to 300 parts by mass, from 20 to 200 parts by mass, or from 50 to 100 parts by mass per 100 parts by mass of polymerizable monomer.

The polymer particles obtained by the method described above are packed into an SFC column as a column packing material. FIG. 1 shows a mode of embodiment of an SFC column. The SFC column 10 shown in FIG. 1 comprises a column main body section 11, a connecting section 12, and a column packing material 13 according to the present mode of embodiment as described above. A connecting section 12 is disposed at both ends of the column main body section 11 to connect the column main body section 11 to the SFC device. The column packing material 13 is packed into the tubular column main body section 11. The material of the column main body section 11 and the connecting section 12 is not particularly limited, and may be stainless steel or a resin such as polyether ether ketone (PEEK), but from the standpoint of pressure resistance of the column, stainless steel is preferable.

The SFC column 10 according to the present mode of embodiment is produced through a step of packing the column packing material 13 containing polymer particles according to the present mode of embodiment as described above into the column main body section 11.

The solvent used when packing the column packing material 13 into the column main body section 11 of the SFC column 10 is not particularly limited as long as it is a solvent in which the polymer particles (column packing material) will disperse, with examples thereof including water, methanol, THF, acetonitrile, chloroform, ethylene glycol and liquid paraffin. These may be used singly or in combinations of two or more in arbitrary proportions.

The column packing pressure when packing the column packing material 13 into the SFC column 10, from the standpoint of obtaining a better peak shape and producing a column of sufficiently good durability, may be, for example, 10 MPa or higher or 15 MPa or higher. From the standpoint of preventing deformation of the column packing material 13 and breakage of the column, the column packing pressure may be, for example, 60 MPa or lower or 50 MPa or lower.

The SFC column according to the present mode of embodiment as described above is particularly well suited for analysis of free fatty acid and the like, and for analysis of agricultural chemicals and the like and fractionation thereof. Further, it has excellent durability for repeated analysis.

While a preferred mode of embodiment of the present invention has been described above, the present invention is not limited to the above mode of embodiment and various modifications are possible. For example, the column packed with the column packing material according to the present mode of embodiment can be suitably used not just as a column for SFC but also, for example, as a column for liquid chromatography.

EMBODIMENT EXAMPLES

The present invention will be described in detail below based on embodiment examples. The present invention is however not limited to the following embodiment examples.

Embodiment Example 1

<Synthesis of Seed Particles>

70 g of methyl methacrylate, 2.1 g of octanethiol and 370 g of ion-exchanged water were placed into a 500 mL separable flask, and were bubbled with nitrogen and heated at 30° C. for 1 hour while stirring with a stirring blade. Thereafter, 0.875 g of potassium peroxodisulfate and 30 g of ion-exchanged water were added and reacted at 70° C. for 6 hours to form seed particles. After cooling the reaction liquid, lumps and fine particles in the reaction liquid were removed to obtain a seed particles slurry (solid concentration: 3.5% by mass). The lumps were removed using a sieve with 75 μm openings. The fine particles were removed by treating the reaction liquid from which lumps had been removed (the slurry that passed through the sieve) with a centrifugal dehydrator and discarding the supernatant liquid through decantation.

The mean particle diameter of seed particles in the obtained slurry and the CV value (coefficient of variation) of particle diameter were computed by measuring particle size distribution with a particle size distribution analyzer (product name: MT-3300EX II, made by MicrotracBEL Corp.). The mean particle diameter of the obtained seed particles was 750 nm, and the CV value was 6.4%.

<Synthesis of Polymer Particles>

100 g of divinyl benzene (purity : 94%) as a cross-linkable monomer, and 36 g of toluene and 36 g of diethyl benzene as organic solvents were charged into a 2 L separable flask, and 7.0 g of benzoyl peroxide was dissolved as a polymerization initiator into the obtained mixture. Next, 1240 g of ion-exchanged water, 96 g of ethanol, 32 g of an aqueous solution containing 40% by mass of triethanolamine lauryl sulfate as a surfactant, and 0.12 g of ascorbic acid as a polymerization inhibitor were further added and ultrasonically dispersed with an ultrasonic horn for 10 minutes to obtain an emulsion. To the obtained emulsion, 77 g of seed particle slurry and 27 g of ion-exchanged water were added while stirring with a stirring blade, and this mixture was kept warm for 24 hours at 30° C. Next, 120 g of an aqueous solution containing 6% by mass of polyvinyl alcohol as a dispersion stabilizer was added, and polymerization was performed at 80° C. for 8 hours while bubbling with nitrogen, followed by cooling. The obtained particles were washed with an ion-exchanged water/methanol mixed liquid and with acetone, and then wet-classified using a sieve with 5 μm opening to remove agglomerates. Particles were filtered off from the slurry after removal of the agglomerates and were dried to obtain polymer particles. The degree of cross-linking of the cross-linked polymer calculated based on the mass ratio of divinylbenzene with reference to the total mass of polymerizable monomers was 94%. Furthermore, the mean particle diameter of the obtained polymer particles and the CV value (coefficient of variation) of particle diameter were calculated by measuring the particle size distribution using a particle size distribution analyzer (trade name: Multisizer 4e, made by Beckman Coulter Co.). The mean particle diameter of the obtained polymer particles was 3.1 μm and the CV value was 18%.

The degree of swelling of the obtained polymer particles after absorbing tetrahydrofuran (THF) and the degree of swelling after absorbing methanol were measured according to the following method. First, 1 g of polymer particles which had been dried at 60° C. for 3 hours or more in a vacuum dryer was charged into a 10 ml graduated cylinder, which was then tapped 20 or more times, after which the apparent volume (Vd ml) of polymer particles was measured by reading the scale of the graduated cylinder. Thereafter, solvent was added to the graduated cylinder so that the total amount of polymer particles and solvent was 10 ml. After leaving to rest at room temperature (20° C.) for 24 hours or more, the apparent volume (Vw ml) of the polymer particles deposited on the bottom of the graduated cylinder was measured by reading the scale of the graduated cylinder, and the degree of swelling (S) was calculated according to following formula.

$$S = Vw/Vd$$

The degree of swelling after absorbing tetrahydrofuran (THF) was 1.32, and the degree of swelling after absorbing methanol was 1.31. The properties of the polymer particles (packing material) of Embodiment Example 1 are summarized in Table 1.

<Preparation of SFC Column>

To a 100 mL beaker were added 1.3 g of polymer particles obtained above and 12.7 g of THF, and the particles were dispersed and mixed while subjecting to ultrasonic treatment to prepare a slurry for packing. The slurry for packing was then poured into a stainless steel packer to which a 4.6 mm ⌀×150 mm stainless steel column had been attached, and after sealing, a pressure of 18 MPa was applied using a plunger-type packing pump (product name: PU713 Pump, made by GL Sciences, Inc.) to pack the polymer particles into the column and prepare a column for SFC.

<Evaluation of Characteristics>

Figure 2:
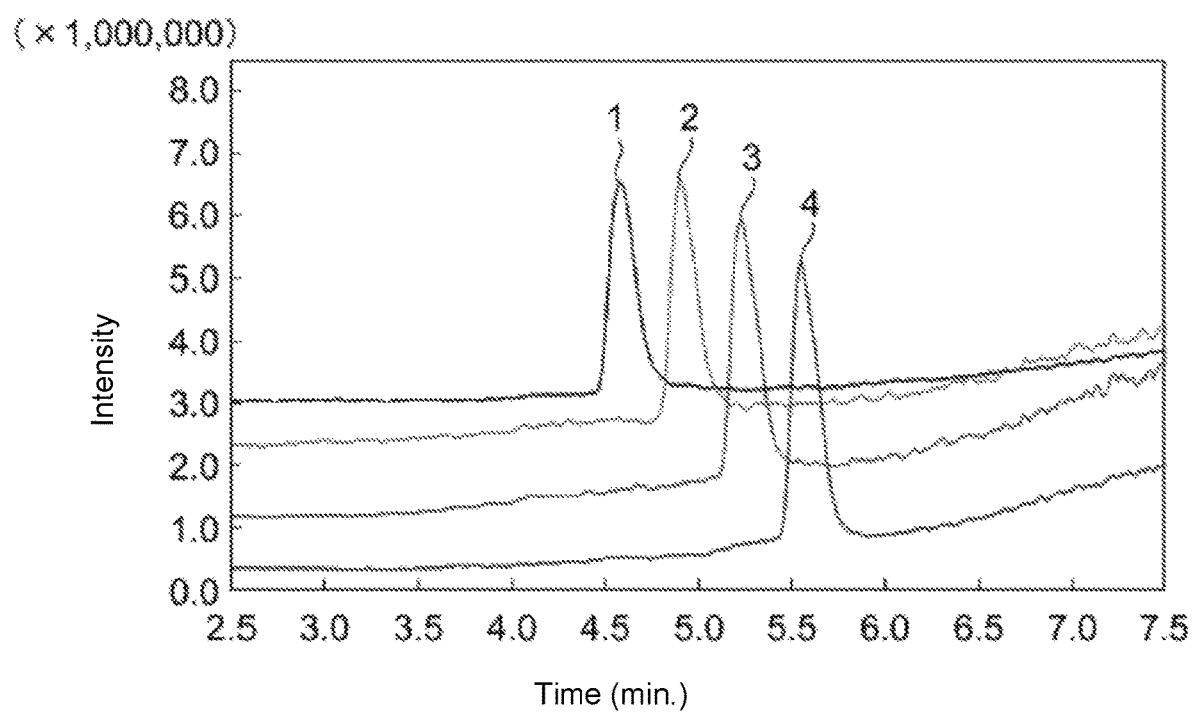
FIG. 2 is a drawing illustrating analysis results obtained by performing analysis of free fatty acids using the packing material obtained in Embodiment Example 1.

The SFC column prepared above was attached to an SFC apparatus, and analysis of free fatty acids (a mixture of 1 mg/L each of myristic acid, palmitic acid, stearic acid and eicosanoic acid) was performed under the following conditions. Furthermore, to confirm the durability of the column, the analysis was repeated. FIG. 2 shows the analysis results for the $10^{th}$ analysis performed. Even when repeated analysis was performed, peak 1 of myristic acid, peak 2 of palmitic acid, peak 3 of stearic acid and peak 4 of eicosanoic acid all had good shape, indicating that durability was good.
(Analysis Conditions)
  Mobile phase liquid A: $CO_2$
  Mobile phase liquid B: 2-propanol
  Gradient conditions: 0→8 min: liquid B 5%→60%; 8→12 min: liquid B 60%→5%
  Column temperature: 40° C.
  Flow velocity: 1.5 mL/minute
  Back pressure: 15 MPa
  Injection volume: 1 µL
  Detector: mass spectrometer (product name: LCMS-8060, made by Shimadzu Corporation)

Embodiment Example 2

<Synthesis of Seed Particles>
Seed particles were synthesized by the same method as in Embodiment Example 1.
<Synthesis of Polymer Particles>
81 g of glycerol dimethacrylate (purity: 93%) as a cross-linkable monomer, 73 g of butyl acetate as an organic solvent and 48 g of isoamyl alcohol were charged into a 3 L separable flask, after which 0.4 g of 2,2'-azobisisobutyronitrile was dissolved in the obtained mixture as a polymerization initiator. Next, 1,530 g of ion-exchanged water and 12 g of an aqueous solution containing 40% by mass of triethanolamine lauryl sulfate as a surfactant were further added, and ultrasonic dispersion was performed using an ultrasonic horn for 10 minutes to obtain an emulsion. To the obtained emulsion, 14 g of seed particle slurry and 122 g of ion-exchanged water were added while stirring with a stirring blade, and this mixture was kept warm at 30° C. for 1 hour. Next, 121 g of an aqueous solution containing 6% by mass of polyvinyl alcohol as a dispersion stabilizer was added and polymerization was performed at 78° C. for 5 hours while bubbling with nitrogen, followed by cooling. The obtained particles were washed with ion-exchanged water, an ion-exchanged water/methanol mixed liquid, and methanol, and then were wet-classified using a sieve with 5 µm openings to remove agglomerates. Particles were filtered off from the slurry after removal of the agglomerates and were dried to obtain polymer particles. The degree of cross-linking of the polymer particles calculated based on the mass ratio of glycerol dimethacrylate with reference to the total mass of polymerizable monomers was 93%. Furthermore, the mean particle diameter of the obtained polymer particles and the CV value (coefficient of variation) of particle diameter were calculated by measuring the particle size distribution using a particle size distribution analyzer (trade name: Multisizer 4e, made by Beckman Coulter Co.). The mean particle diameter of the obtained polymer particles was 3.5 µm and the CV value was 7%.

The degree of swelling of the obtained polymer particles was measured in the same manner as in Embodiment Example 1, whereupon the degree of swelling after absorbing tetrahydrofuran (THF) was 1.05 and the degree of swelling after absorbing methanol was 1.37. The properties of the polymer particles (packing material) of embodiment example 2 are summarized in Table 1.

Figure 3:
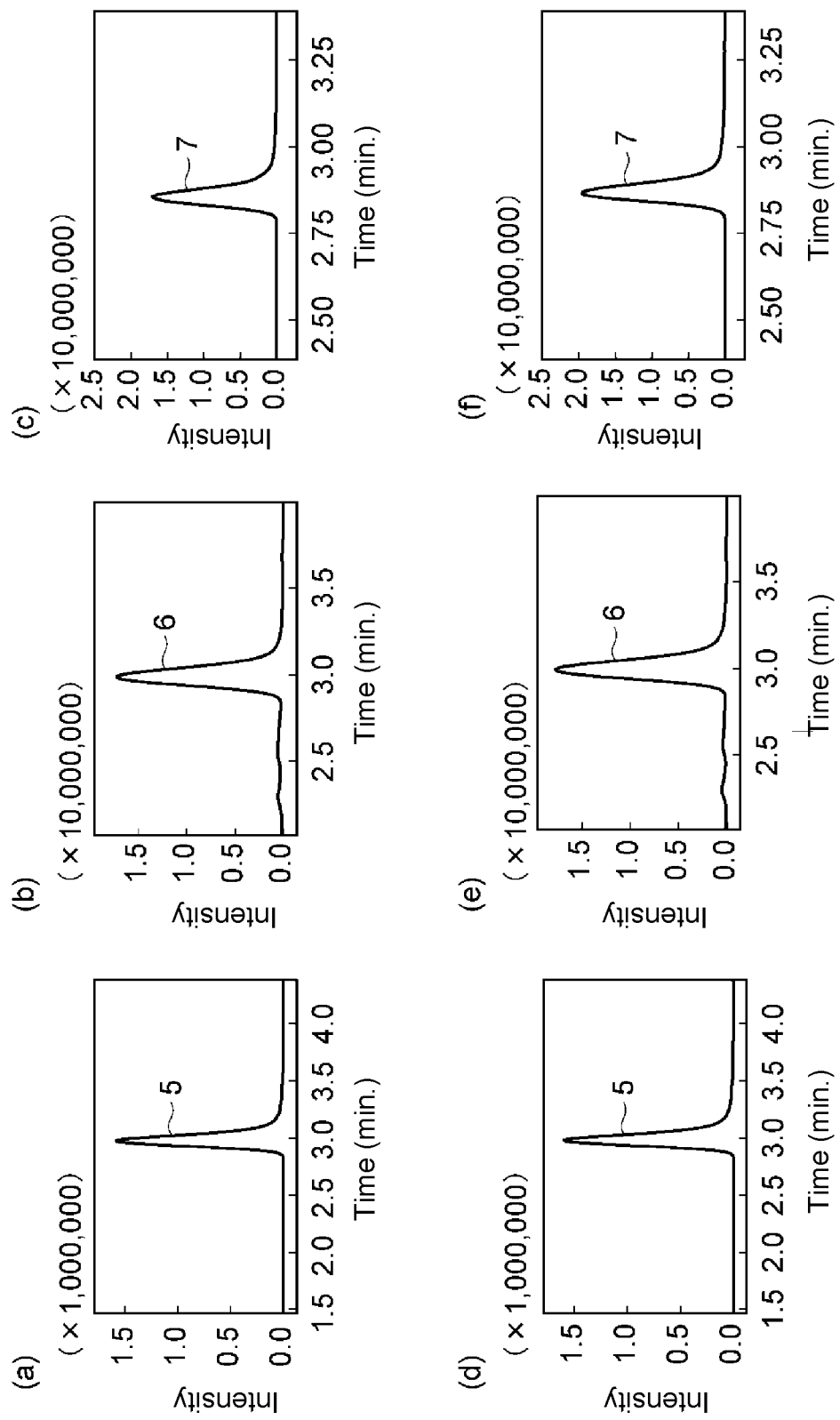
FIG. 3 at (a) to (c) are drawings illustrating analysis results obtained by performing a first analysis of thiofanox sulfone, carbofuran and propoxur, which are types of agricultural chemical components, using the packing material obtained in Embodiment Example 2, and FIG. 3 at (d) to (f) are drawings illustrating analysis results obtained by performing analysis on the aforesaid components after repeated analysis has been performed.
Figure 4:
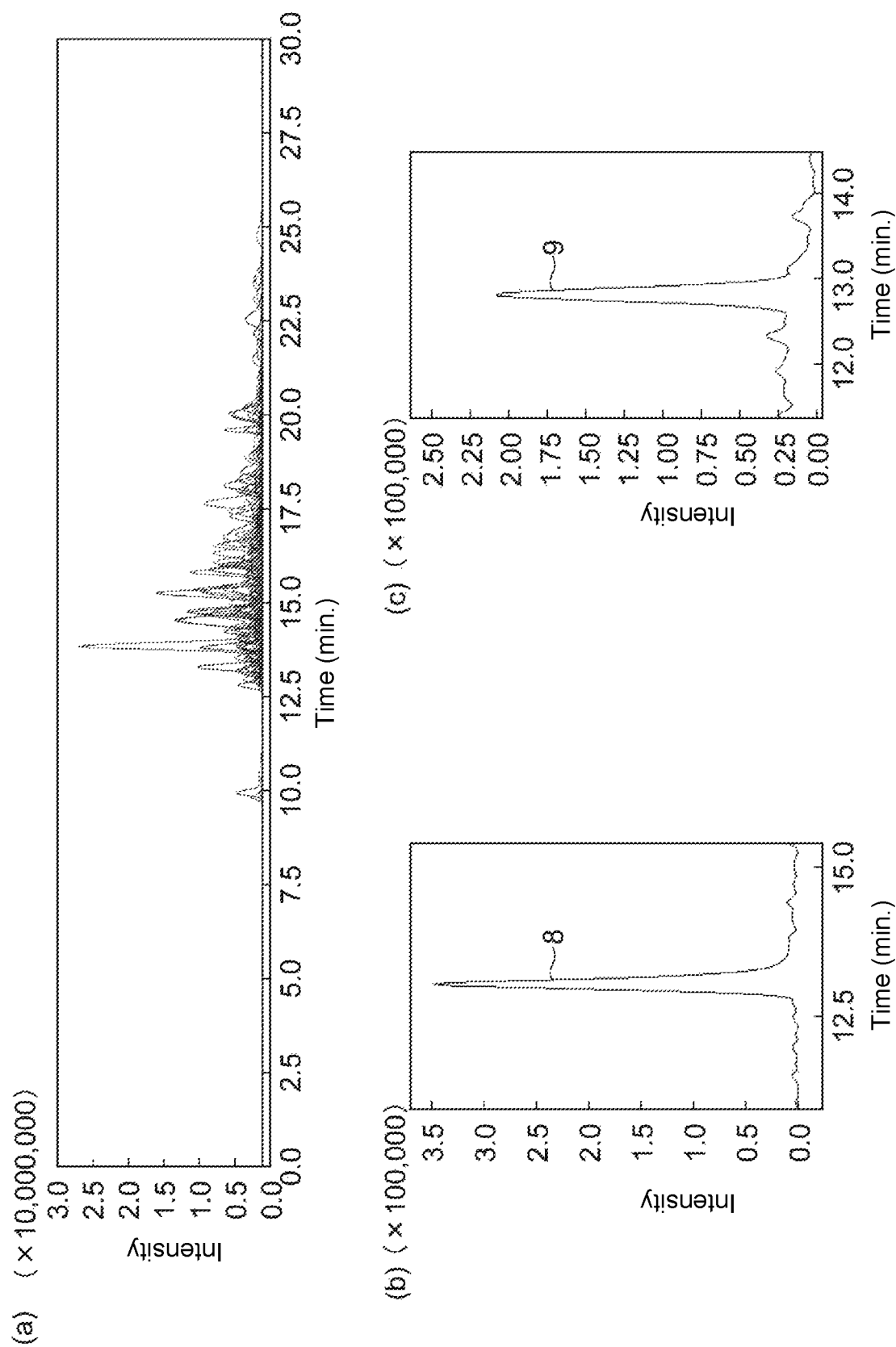
FIG. 4 at (a) is a drawings illustrating analysis results obtained by performing analysis of agricultural chemicals using the packing material obtained in Embodiment Example 2, and FIG. 4 at (b) and (c) are drawings respectively showing the peaks for dichlorvos and methacrifos, which are types of the aforementioned agricultural chemical components.

<Preparation of SFC Column>
To a 100 mL beaker were added 2.4 g of the polymer particles obtained above and 13.6 g of ultrapure water, and the particles were dispersed and mixed while subjecting to ultrasonic treatment to prepare a slurry for packing. The slurry for packing was then poured into a stainless steel packer to which a 4.6 mm ø×150 mm stainless steel column had been attached, and after sealing, a pressure of 18 MPa was applied using a plunger-type packing pump (product name: PU713 Pump, made by GL Sciences, Inc.) to pack the polymer particles into the column and prepare a column for SFC.
<Evaluation of Characteristics>
The SFC column prepared above was attached to an SFC apparatus and analysis of a mixed sample containing thiofanox sulfone, carbofuran and propoxur at a concentration of 100 µg/L each was performed under the following conditions. Further, to confirm the durability of the column, the analysis was repeated. The analysis results for thiofanox sulfone, carbofuran and propoxur obtained in the first analysis are shown in FIG. 3 at (a) through (c), respectively. Furthermore, the respective analysis results after repeated analysis ($20^{th}$ analysis) are shown in FIG. 3 at (d) through (f). The shapes of peak 5 of thiofanox sulfone, peak 6 of carbofuran and peak 7 of propoxur were good even after performing repeated analysis.
(Analysis Conditions)
  Mobile phase liquid A: $CO_2$
  Mobile phase liquid B: methanol
  Gradient conditions: 0→10 min: liquid B 5%→80%; 10→13 min: liquid B 80%→5%
  Column temperature: 40° C.
  Flow velocity: 2.0 mL/minute
  Back pressure: 15 MPa
  Injection volume: 1 µL
  Detector: Mass spectrometer (product name: LCMS-8060, made by Shimadzu Corporation)
<Evaluation of Characteristics>
The SFC column prepared above was attached to an SFC apparatus, and simultaneous analysis was performed on the following agricultural chemical mix standard solutions (product names: PL2005 Pesticide GC-MS Mix I, II, III, IV, V, VI, 7, PL2005 Pesticide LC-MS Mix I, II, III, 4, 5, 6, 7, 8, 9, 10, and 53 Polar Pesticides Mix (for STQ method), made by Hayashi Pure Chemical Ind, Ltd.). Furthermore, to confirm the durability of the column, the analysis was repeated. FIG. 4 at (a) shows a chromatogram for the $14^{th}$ repeated analysis, and FIG. 4 at (b) and (c) show the peaks for dichlorvos and methacrifos, which are types of components of the aforementioned agricultural chemicals. Even after repeated analysis had been performed, analysis of all of the aforementioned agricultural chemicals was still possible, so durability was also good. In particular, the shapes of peak 8 of dichlorvos and the peak 9 of methacrifos, which are types of agricultural chemical components, were all good.
(Analysis Conditions)
  Mobile phase liquid A: $CO_2$
  Mobile phase liquid B: 2-propanol
  Gradient conditions: 0→20 min: liquid B 2%→80%; 20→25 min: liquid B 80%; 25→30 min: liquid B 80%→2%
  Column temperature: 40° C.
  Flow velocity: 0.35 mL/minute
  Back pressure: 15 MPa
  Injection volume: 1 µL
  Detector: Mass spectrometer (product name: LCMS-8060, made by Shimadzu Corporation)

Comparison Example 1

<Synthesis of Polymer Particles>

14 g of benzoyl peroxide as a polymerization initiator, 59 g of styrene as a polymerizable monomer, 48 g of divinyl benzene (purity 60%) as a cross-linkable monomer, as well as 46 g of toluene, 46 g of diethyl benzene and 16 g of dodecane as organic solvents were dispersed in a solvent (725 mL of 0.1% methyl cellulose aqueous solution, 730 mL of 10% tribasic calcium phosphate slurry and 0.06 mL of 1% sodium dodecyl benzene sulfonate aqueous solution) and treated with a homogenizer for 30 minutes to prepare oil droplets with a mean particle diameter of about 7 μm. This liquid was heated to 80° C. while stirring, and polymerization was carried out for 7 hours. After completion of the polymerization, hydrochloric acid was added to dissolve the tribasic calcium phosphate. Washing was then performed with water and methanol, and wet classification was performed using sieves with 10 μm 5 μm openings to remove particles of 10 μm or larger and particles of 5 μ[m] or smaller. The particles were filtered out and dried to obtain polymer particles. The degree of cross-linking of the obtained polymer particles was computed to be 27%. Furthermore, the mean particle diameter of the obtained polymer particles was 7.1 μm and the CV value was 25%.

The degree of swelling of the obtained polymer particles was measured in the same manner as in Embodiment Example 1, whereupon the degree of swelling after absorbing tetrahydrofuran (THF) was 2.26, and the degree of swelling after absorbing methanol was 1.93. The properties of the polymer particles (packing material) of Comparison Example 1 are summarized in Table 1.

<Preparation of SFC Column>

To a 100 mL beaker were added 1.3 g of the polymer particles obtained above and 7.1 g of THF, and the particles were dispersed and mixed while subjecting to ultrasonic treatment to prepare a slurry for packing. The slurry for packing was then poured into a stainless steel packer to which a 4.6 mm ø×150 mm stainless steel column had been attached, and after sealing, a pressure of 3.2 MPa was applied using a plunger-type packing pump (product name: PU713 Pump, made by GL Sciences, Inc.) to pack the polymer particles into the column and prepare a column for SFC.

<Evaluation of Characteristics>

Figure 5:
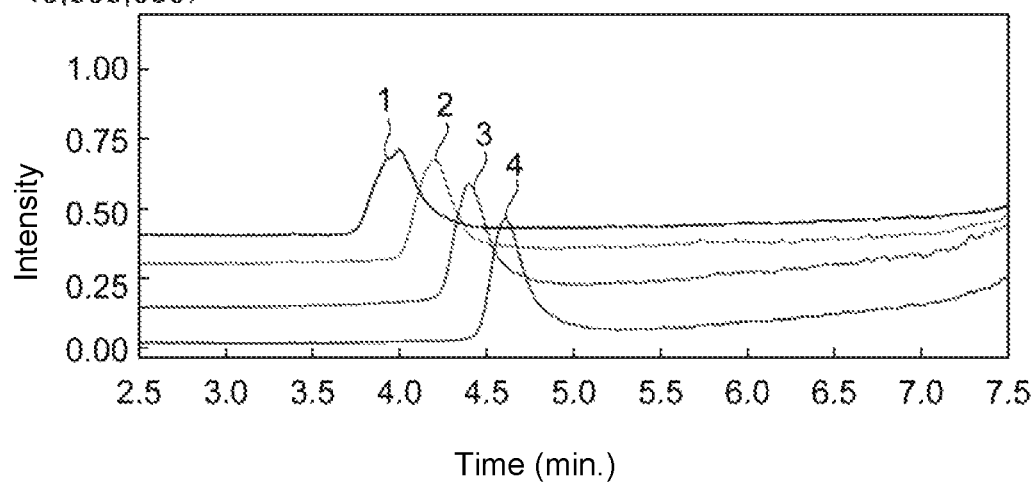
FIG. 5 at (a) is a drawing illustrating analysis results obtained by performing a first analysis of free fatty acids using the packing material obtained in Comparison Example 1, and FIG. 5 at (b) is a drawing illustrating analysis results obtained after performing repeated analysis.
Figure 5:
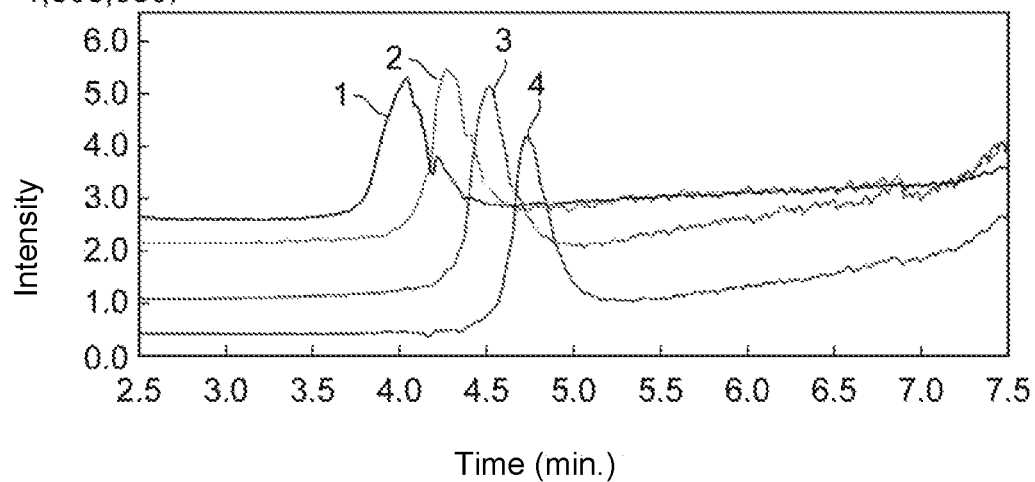

The SFC column prepared above was attached to an SFC apparatus and fatty acid analysis was performed under the same conditions as in embodiment example 1. FIG. 5 at (a) shows the analysis from performing the first analysis, and FIG. 5 at (b) shows the analysis results from performing the 11th analysis. As shown in FIG. 5 at (a), even in the first analysis, peak 1 of myristic acid, peak 2 of palmitic acid, peak 3 of stearic acid and peak 4 of eicosanoic acid all had a broad shape, and a state in which the peaks overlap each other was observed. Further, as shown in FIG. 5 at (b), it was demonstrated that peaks became broader with repeated analysis, peak splitting and noise occurred, and durability was also poor.

Comparison Example 2

<Synthesis of Polymer Particles>

6 g of azobis-isobutyronitrile as a polymerization initiator, 480 g of an NK Ester M-90G (product name, made by Shin-Nakamura Chemical Co., Ltd.) as a polymerizable monomer and 720 g of NK Ester A-TMM-3L (product name, made by Shin-Nakamura Chemical Co., Ltd.) as a cross-linkable monomer, along with 1,000 g of n-butyl acetate and 40 g n-octane as organic solvents were dispersed in solvent (14.6 L of 0.1% methyl cellulose aqueous solution, 5.5 L of 10% tribasic calcium phosphate slurry, and 1 mL of 1% sodium dodecyl benzene sulfonate aqueous solution) and treated for 30 minutes with a homogenizer to prepare oil droplets with a mean particle diameter of about 9 μm. This liquid was heated to 80° C. while stirring, and polymerization was carried out for 7 hours. After completion of the polymerization, hydrochloric acid was added to dissolve the tribasic calcium phosphate. Washing was then performed using water and methanol, and wet classification was performed using sieves with 10 μm and 8 μm openings to remove particles of 10 μm or larger and particles of 8 μm or smaller. The particles were filtered out and dried to obtain polymer particles. The degree of cross-linking of the obtained polymer particles was computed to be 60%. Furthermore, the mean particle diameter of the obtained polymer particles was 9.4 μm and the CV value was 12%

The degree of swelling of the obtained polymer particles was measured in the same manner as in Embodiment Example 1, whereupon the degree of swelling after absorbing tetrahydrofuran (THF) was 1.01, and the degree of swelling after absorbing methanol was 1.47. The properties of the polymer particles (packing material) of Comparison Example 1 are summarized in Table 1.

<Preparation of SFC Column>

To a 100 mL beaker were added 2.5 g of the polymer particles obtained above, 8.4 g of acetonitrile and 8.4 g of water, and the particles were dispersed and mixed while subjecting to ultrasonic treatment to prepare a slurry for packing. The slurry for packing was then poured into a stainless steel packer to which a 4.6 mm ø×150 mm stainless steel column had been attached, and after sealing, a pressure of 7 MPa was applied using a plunger-type packing pump (product name: PU713 Pump, made by GL Sciences, Inc.) to pack the polymer particles into the column and prepare a column for SFC.

<Evaluation of Characteristics>

Figure 6:
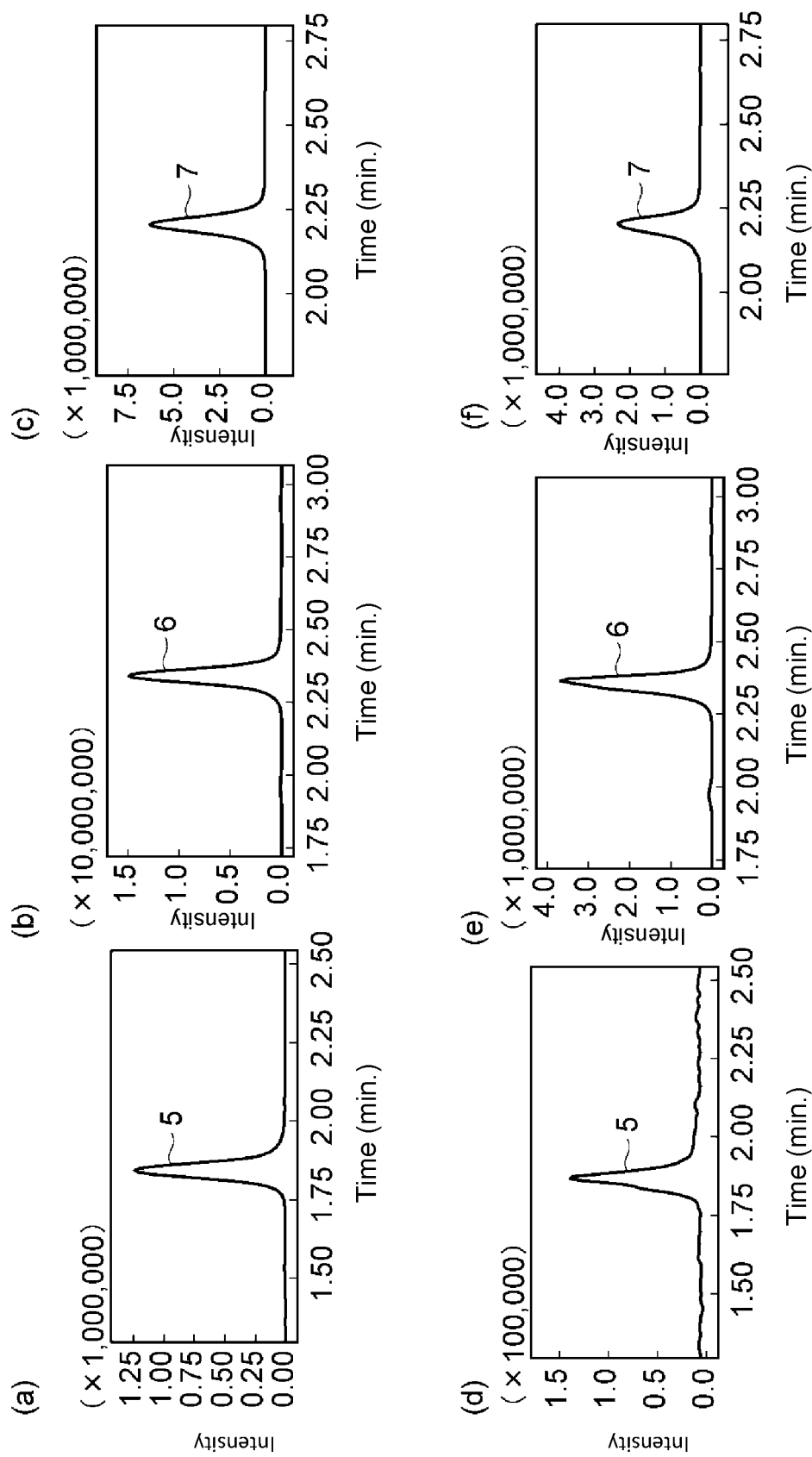
FIG. 6 at (a) to (c) are drawings illustrating analysis results obtained by performing a first analysis of thiofanox sulfone, carbofuran and propoxur, which are types of agricultural chemical components, using the packing material obtained in Comparison Example 2, and FIG. 6 at (d) to (f) are drawings illustrating analysis results obtained by performing analysis on the aforesaid components after repeated analysis has been performed.

The SFC column prepared above was attached to an SFC apparatus and analysis of thiofanox sulfone, carbofuran and propoxur was performed under the same conditions as in Embodiment Example 2. The analysis results for thiofanox sulfone, carbofuran and propoxur from the first analysis are shown in FIG. 6 at (a) through (c), respectively. Furthermore, the respective analysis results after repeated analysis (22nd analysis) are shown in FIG. 6 at (d) through (f). As shown in FIG. 6 at (d) through (f), the shapes of peak 5 of thiofanox sulfone, peak 6 of carbofuran, and peak 7 of propoxur became broader after repeated analysis, indicating poor durability.

Comparison Example 3

Figure 7:
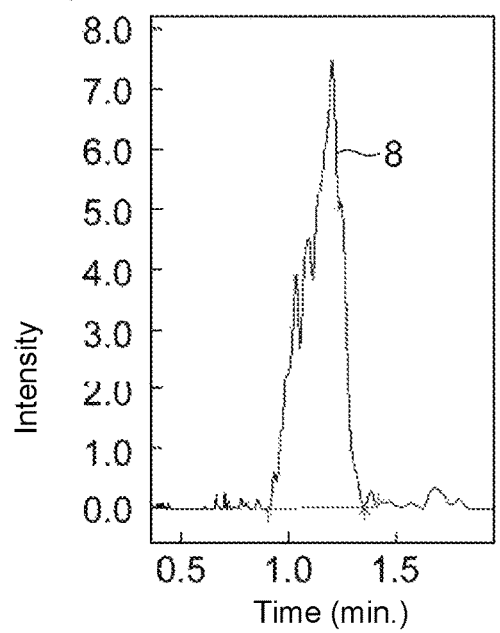
FIG. 7 at (a) and (b) are respectively drawings illustrating peaks for dichlorvos and methacrifos, which are types of the aforementioned agricultural chemical components, when analysis of agricultural chemicals is performed using the packing material of Comparison Example 2.
Figure 7:
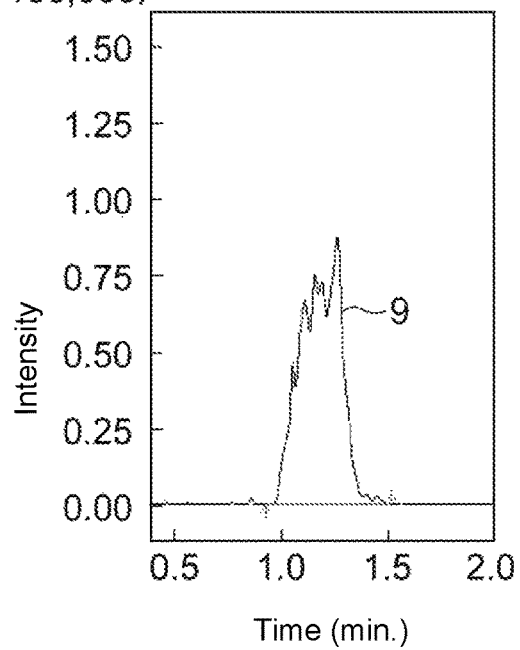

Using commercially available silica particles (product name: Shim-pack UC-RP, P/N 227-30403-01, particle diameter: 5 μm, made by Shimadzu Corporation), the same agricultural chemical samples as in embodiment example 3 were analyzed under the following conditions. FIG. 7 at (a) and (b) show the peaks for dichlorvos and methacrifos, which are types of components of the aforementioned agricultural chemicals. Peak splitting was observed in both peak 8 of dichlorvos and peak 9 of methacrifos, confirming that good analysis was not possible.

(Analysis Conditions)

Mobile phase liquid A: $CO_2$

Mobile phase liquid B: methanol

Gradient conditions: 0→12 min: liquid B 5%→10%; 12→20 min: liquid B 10%→80%; 20→25 min: liquid B 80%, 25→30 min: liquid B 80%→5%

Column temperature: 40° C.

Flow velocity: 1.0 mL/minute

Back pressure: 15 MPa

Injection volume: 1 μL

Detector: Mass spectrometer (product name: LCMS-8060, made by Shimadzu Corporation)

TABLE 1

|  | Embodiment Example 1 | Embodiment Example 2 | Comparison Example 1 | Comparison Example 2 | Comparison Example 3 |
|---|---|---|---|---|---|
| Degree of cross-linking (%) | 94 | 93 | 27 | 60 | — |
| Degree of swelling THF | 1.32 | 1.05 | 2.26 | 1.01 | — |
| Methanol | 1.31 | 1.37 | 1.93 | 1.47 | — |
| Mean particle diameter (μm) | 3.1 | 3.5 | 7.1 | 9.4 | 5 |
| CV value (%) | 18 | 7 | 25 | 12 | — |
| Column packing pressure (MPa) | 18 | 18 | 3.2 | 7 | — |

DESCRIPTION OF REFERENCE SYMBOLS

10 . . . SFC column, 11 . . . column main body section, 12 . . . connecting section, 13. . . column packing material.

What is claimed is:

1. A column packing material for supercritical fluid chromatography, comprising:
   polymer particles containing a cross-linked polymer, the degree of swelling of the polymer particles after absorbing tetrahydrofuran is 1.32 or less, and the degree of swelling of the polymer particles after absorbing methanol is 1.37 or less,
   wherein said cross-linked polymer comprises at least one member of the group consisting of divinyl benzene derived structural units and di(meth)acrylic acid ester derived structural units,
   wherein the polymer particles are prepared by inducing seed polymerization of a polymerizable monomer in the presence of seed particles, and
   wherein the degree of cross-linking of said cross-linked polymer is 90% or greater.

2. The packing material as set forth in claim 1, wherein a mean particle diameter of said polymer particles is 1 to 10 μm.

3. A column for supercritical fluid chromatography, comprising:
   a packing material as set forth in claim 1.

4. A column for supercritical fluid chromatography, comprising:
   a packing material as set forth in claim 3.

5. A method of preparing a packing material, comprising:
   obtaining polymer particles by inducing seed polymerization of a polymerizable monomer in the presence of seed particles to provide the packing material as set forth in claim 1.

6. A method of preparing a packing material, comprising:
   obtaining polymer particles by inducing seed polymerization of a polymerizable monomer in the presence of seed particles to provide the packing material as set forth in claim 2.

7. A method of preparing a column for supercritical fluid chromatography, comprising:
   packing the packing material as set forth in claim 1 into a tubular column main body section such that the packing pressure becomes 10 MPa or greater.

8. A method of preparing a column for supercritical fluid chromatography, comprising:
   packing the packing material as set forth in claim 2 into a tubular column main body section such that the packing pressure becomes 10 MPa or greater.

* * * * *